(12) United States Patent
Altman et al.

(10) Patent No.: US 7,454,699 B2
(45) Date of Patent: Nov. 18, 2008

(54) SMART CONTENT INSERTION

(75) Inventors: Dan Altman, Kirkland, WA (US); David Switzer, Redmond, WA (US); Christopher Michael Shelley, Bellevue, WA (US); Richard Grutzmacher, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 10/393,949

(22) Filed: Mar. 24, 2003

(65) Prior Publication Data
US 2004/0194030 A1    Sep. 30, 2004

(51) Int. Cl.
*G06F 17/00* (2006.01)
*G06F 3/048* (2006.01)

(52) U.S. Cl. .................. 715/255; 715/250; 715/256; 715/770

(58) Field of Classification Search .............. 715/530, 715/531, 540, 541, 515, 770, 225, 250, 251, 715/255, 256
See application file for complete search history.

(56) References Cited

U.S. PATENT DOCUMENTS

| | | | | |
|---|---|---|---|---|
| 4,723,209 A | | 2/1988 | Hernandez et al. | |
| 5,214,755 A | * | 5/1993 | Mason | 715/520 |
| 5,517,621 A | * | 5/1996 | Fukui et al. | 715/517 |
| 5,745,910 A | * | 4/1998 | Piersol et al. | 715/515 |
| 5,845,303 A | * | 12/1998 | Templeman | 715/517 |
| 5,880,740 A | | 3/1999 | Halliday et al. | |
| 5,895,477 A | * | 4/1999 | Orr et al. | 715/517 |
| 6,144,974 A | * | 11/2000 | Gartland | 715/517 |
| 6,473,073 B1 | * | 10/2002 | Fleck | 345/173 |
| 6,589,292 B1 | * | 7/2003 | Langford-Wilson | 715/517 |
| 6,596,032 B2 | * | 7/2003 | Nojima et al. | 715/517 |
| 6,891,536 B2 | | 5/2005 | Smith | |
| 6,915,484 B1 | | 7/2005 | Ayers et al. | |

OTHER PUBLICATIONS

Microsoft Word 2000.*

* cited by examiner

*Primary Examiner*—Rachna Desai
*Assistant Examiner*—Henry Orr
(74) *Attorney, Agent, or Firm*—Birch, Stewart, Kolasch & Birch, LLP

(57) ABSTRACT

A system and method for inserting content is described. A user may designate content to be inserted into a document and have the content inserted into the document at either a designed location or, by determining the content associated with a receiving page, the system may select a location on the receiving page. The user may further choose various options including shrinking the new content to fit the page and/or may choose to have the existing content shifted to make room for the new content.

19 Claims, 9 Drawing Sheets

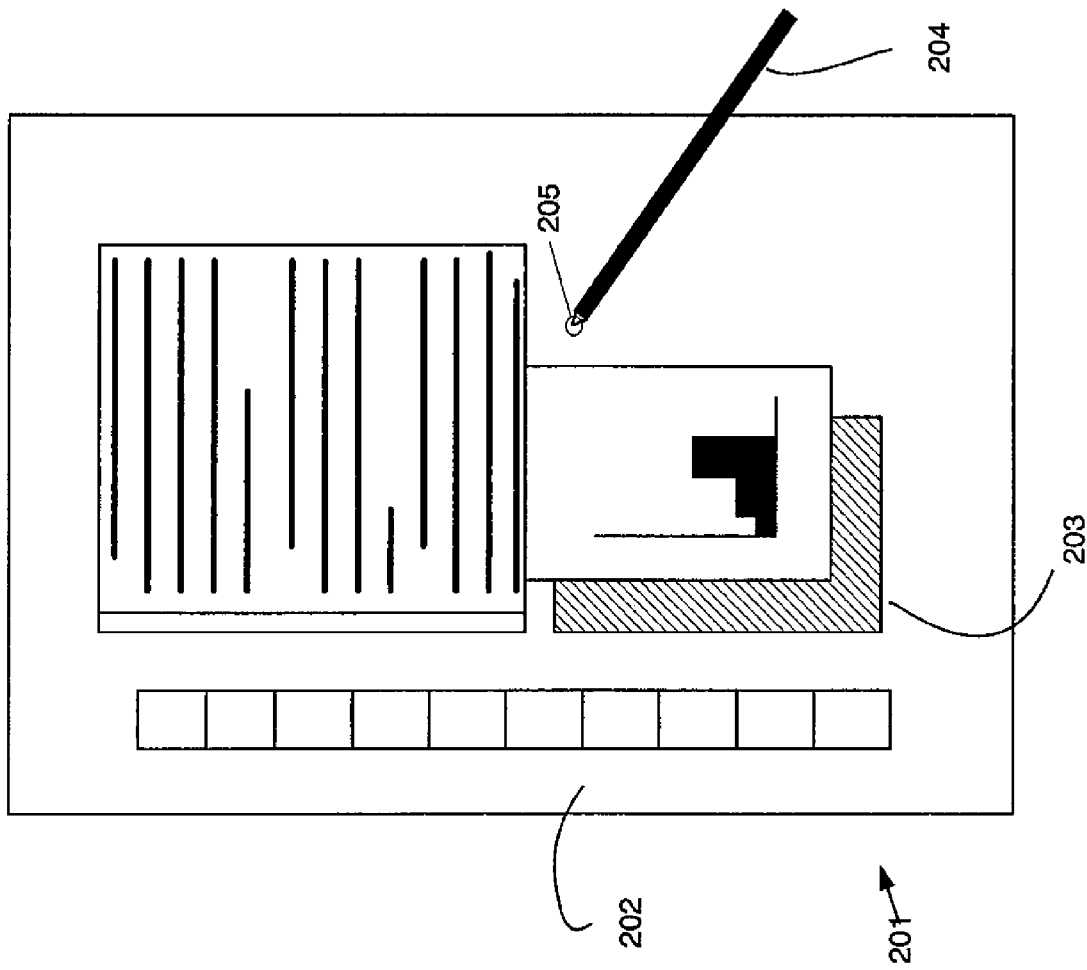

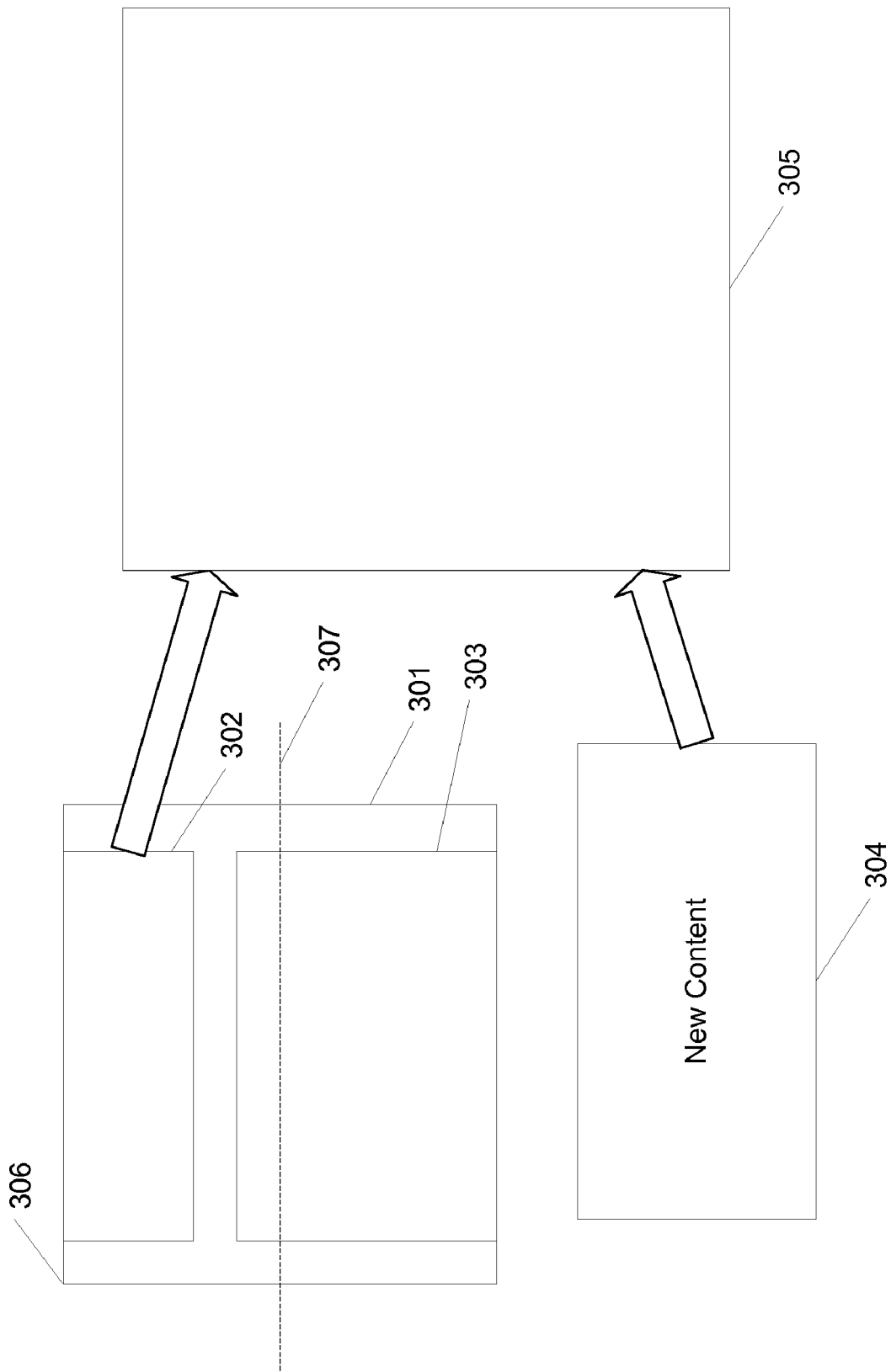

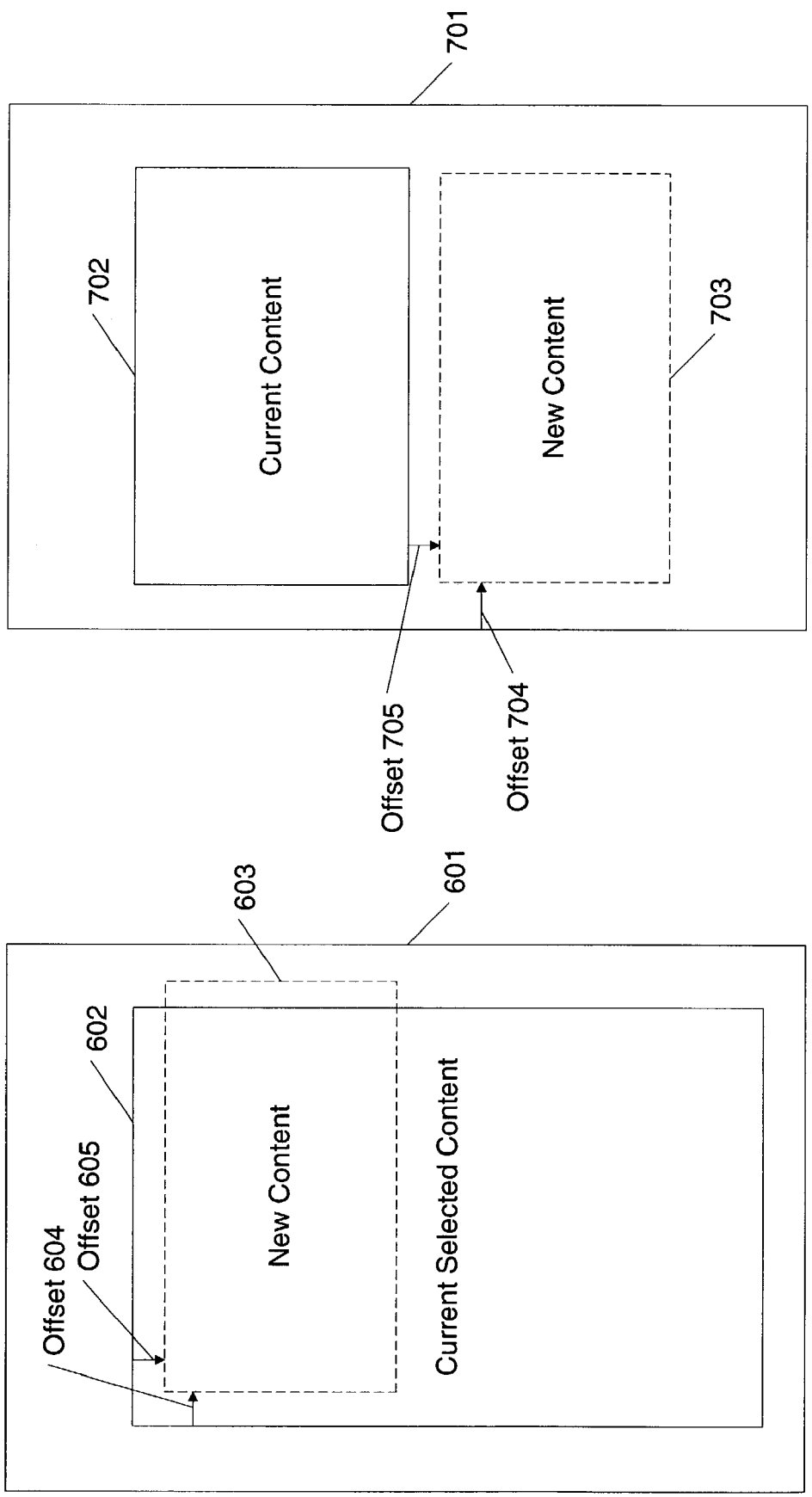

1101

- ○ Insert New Page and Move Existing Content Below Insertion Point Onto Next Page
- ○ Increase Page Height
- ○ Paste Over Top of Existing Content
- ☐ Do not warn if overlap
- ○ Shrink Content to Fit on Current Page

Figure 11

SMART CONTENT INSERTION

TECHNICAL FIELD

Aspects of the present invention relate to the insertion of information. More particularly, aspects of the present invention relate to inserting content into a document or other container.

BACKGROUND

Typical computer systems, especially computer systems using graphical user interface (GUI) systems, such as Microsoft WINDOWS, are optimized for accepting user input from one or more discrete input devices such as a keyboard for entering text, and a pointing device such as a mouse with one or more buttons for driving the user interface.

Some computing systems have expanded the input and interaction systems available to a user by allowing the use of a stylus to input information into the systems. The stylus may take the place of both the keyboard (for data entry) as well as the mouse (for control). Some computing systems receive handwritten electronic information or electronic ink and immediately attempt to convert the electronic ink into text. Other systems permit the electronic ink to remain in the handwritten form.

Traditional computing applications including word processors, notepads, spreadsheets, and drawing packages, and the like permit, to some extent, the insertion of content into a document or other container. In these situations, the application is controlled by keyboard keys or by a mouse, thereby making control and insertion of content into these applications relatively easy. A problem exists in stylus-based computing systems where there may not be a constant cursor appearing on a screen. This lack of a definite insertion point can be problematic for the insertion of content into a document or other container and an application. This difficulty can range from ambiguity in the system not being able to correctly place content and accordance with the users' desire to not being able to place content in the application at all. Accordingly, a new approach to inserting content that permits one to use a stylus-based computing system and a non stylus-based computing system is needed.

SUMMARY

The aspects of the present invention address one or more of the issues described above, thereby providing an easy way for users to insert content into a page and not have to worry about repeatedly correcting the location of the inserted content. In a first aspect of the invention, the location of the content to be inserted is determined by overt actions by the user. In a second aspect of the invention, the location of the content to be inserted is determined by an analysis of the existing content on a page. Yet further aspects of the invention permit a user to determine how the page will respond to the inserted content. The features and other aspects of the invention will become clear in the following description of the drawings.

These and other aspects are addressed in relation to the Figures and related description.

BRIEF DESCRIPTION OF DRAWINGS

The foregoing summary of aspects of the invention, as well as the following detailed description of various embodiments, is better understood when read in conjunction with the accompanying drawings, which are included by way of example, and not by way of limitation with regard to the claimed invention.

FIG. 2 shows a display for a stylus-based input system according to aspects of the present invention.

FIG. 3 shows new content being added to a page in accordance with aspects of the present invention.

FIG. 6 shows new content being added on top of current content in accordance with embodiments of the present invention.

FIG. 7 shows new content being added below current content in accordance with embodiments of the present invention.

FIG. 11 shows options available to a user for determining the location of insertion in accordance with embodiments of the present invention.

DETAILED DESCRIPTION OF THE INVENTION

Figure 1:
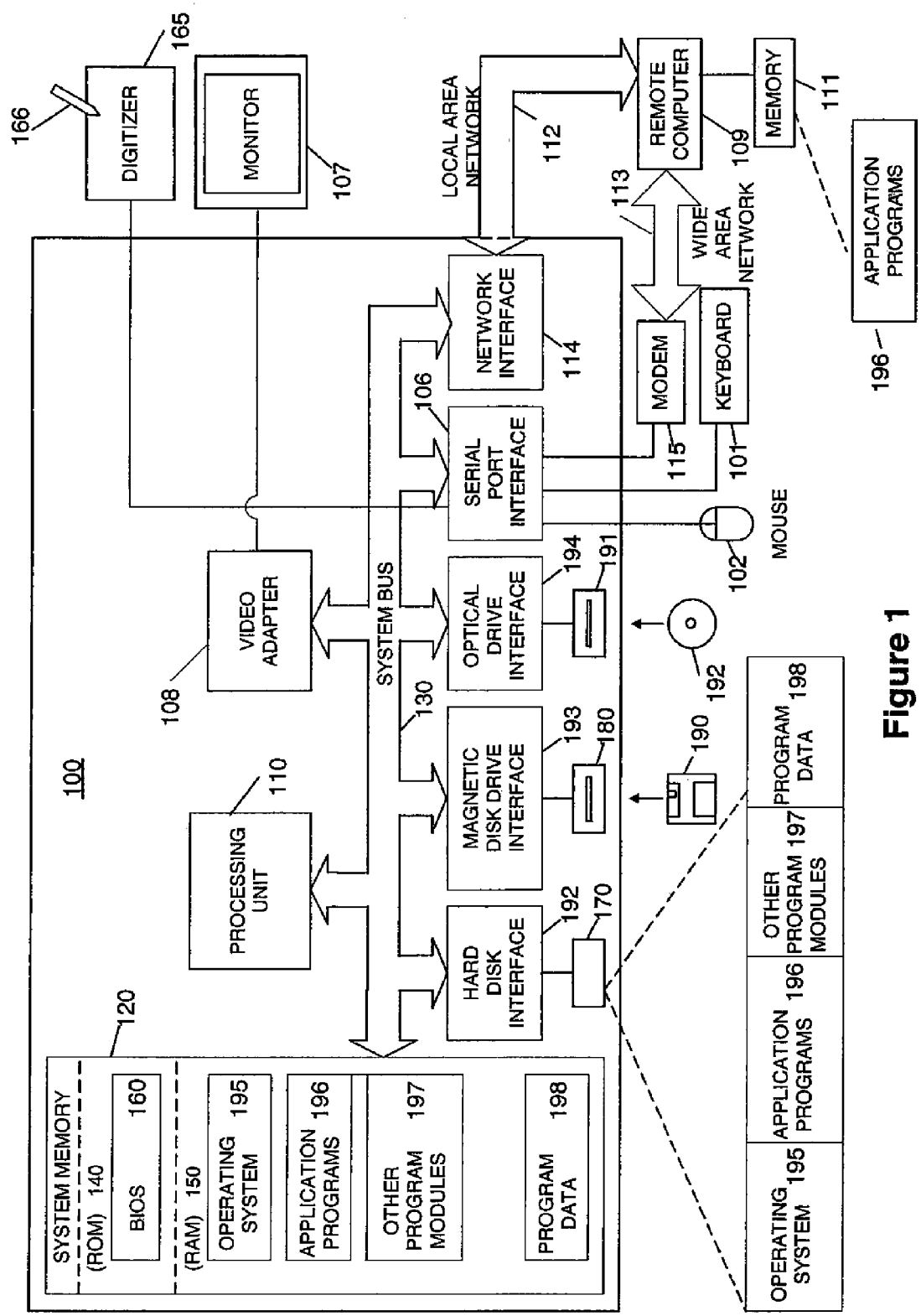
FIG. 1 shows a general-purpose computer supporting one or more aspects of the present invention.

Aspects of the present invention relate to inserting content into documents. The term "document" is used generally herein and includes word processing documents, spreadsheets, images files, presentation files, and the like. The systems and methods described herein relate to using at least one of the present location of an insertion point or previous focus or location of a document on a display to determine where to insert content. Also, in some aspects, the selection of content different from the content to be inserted may be used to determine or adjust where the content to be inserted is going to be placed. Aspects of the present invention may be used with a standard personal computer having a mouse and keyboard. Also, aspects of the present invention may be used with a stylus-based computing system (which may or may not have a mouse (or trackball or touch pad) and a keyboard). In a stylus-based system, a user may create electronic ink by using the ink to draw on the screen. The electronic ink may be stored in graphical form or may be stored in other forms. The content as described below may include electronic ink or other content as is known in the art (drawings, text, images, graphics, tables of information, and the like). To assist the user, the following is arranged with the following subheadings: characteristics of ink; terms; general-purpose computer; content insertion locations; and processes for performing content insertion.

Characteristics of Ink

Electronic ink (or ink) refers to a sequence of strokes, where each stroke is comprised of a sequence of points. The points may be represented using a variety of known techniques including Cartesian coordinates (X, Y), polar coordinates (r, Θ), and other techniques as known in the art.

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve).

To provide the look and feel of physical ink, electronic ink may additionally store ink strokes and properties associated with the ink strokes to more fully render ink. Ink may be stored as a series of strokes and a series of properties. In other situations, ink may be stored with a complex series of properties in which the properties have properties of their own. Properties of the ink may include, for example, color, width, pressure between the stylus and tablet, and angle between the stylus and tablet, and pen shape and the like. While these properties may suffice for many applications, electronic ink is extensible to include custom properties (and other data) generated by additional applications. All strokes and values may be stored directly with excess information. However, alternative versions of ink reflect considerations that eliminate excess information when possible or practicable so as to minimize the physical size of the stored ink.

The properties used to define an ink object and the strokes within the ink object may have varying scope. For example, some properties may apply to all ink strokes in an ink object (e.g., the shape of a pen tip). Other properties may relate only to a specific point (e.g., a point at which a stylus starts a stroke). Others may relate to specific strokes while others may relate to packets of information as reported by hardware (e.g., coordinates, pressure, angle of pen, the intervals of time between reported coordinates, and the like). In short, properties have different levels of scope.

To efficiently store properties, some may be explicitly specified while others may be implicit. In a simple example, all properties may be default properties and not specified in an ink object. So, the ink object may only have X and Y coordinate values. In another example, the ink object may have properties that affect the entire ink object but the properties are specified in the ink object. In a third example, some strokes may have a first set of properties and others have a second set of properties. The properties may be defined initially at the beginning of the ink object and the individual strokes may reference the previously defined properties as needed. Using this approach of defining properties then later referencing the properties promotes a greater efficiency in storing properties. This becomes more apparent as an ink object becomes larger as the number of properties increases and the number of ink strokes referencing the properties increases.

Terms

Ink—A sequence or set of strokes with properties. A sequence of strokes may include strokes in an ordered form. The sequence may be ordered by the time captured or by where the strokes appear on a page. Other orders are possible. A set of strokes may includes sequences of strokes or unordered strokes or any combination thereof Ink object—A data structure storing ink with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

General-Purpose Computer

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a one embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 as known in the art. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Content Insertion Locations

FIG. 3 shows a display 301 in which two pages 302 and 303 are displayed. New content 304 is to be added at an insertion location onto one of the pages displayed on display 301. It is appreciated that more than two pages may be displayed on display 301. Two are shown here for simplicity of illustration.

At least two different approaches may be used to determine upon which page (302 or 303) new content 304 is to be inserted. For example, in a first aspect of the invention, the page that is displayed closest to the top left corner of display 301 (point 306) is considered to be the page receiving the new content. Alternatively, the page that crosses the center of display 301 may be considered to be the page receiving new content (for example, crossing median line 307). Further, the intersection of or proximity of any page to any corner or any point or any line on page 301 may be used to determine the page that is to receive new content 304.

In this example, page 302 is used as the location receiving new content 304. Page 302 is expanded to its full size for illustrative purposes as page 305.

FIGS. 4 through 8 show various approaches to inserting new content on a page. It is appreciated that documents of various forms may be used in accordance with the present invention. For simplicity, aspects of the present invention are described in relation to documents and pages. These terms are being used generically to refer to documents and pages as well as spreadsheets, images, presentations, and other containers and their subdivisions, into which content is to be inserted. Further, the new content 304 may take many forms, as are known in the art.

Figure 4:
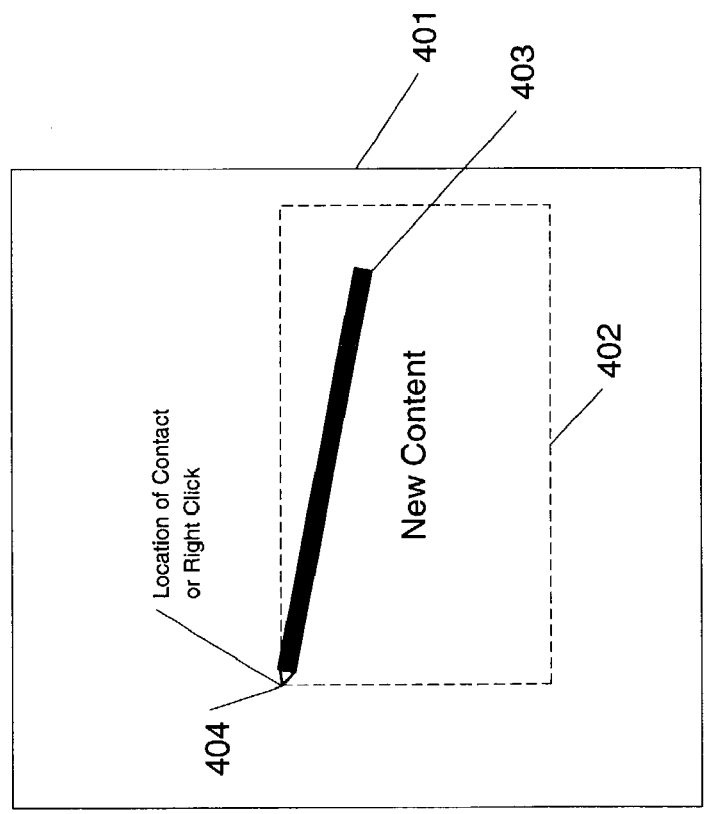
FIG. 4 shows new content being added to the location of an insertion point in accordance with aspects of the present invention.

FIG. 4 shows page 401 with new content 402 and stylus 403. Here, a user has used a stylus 403 to contact the display 401 at location 404. This location 404 may also be the location of the right click of a mouse or any other designation of an insertion or pasting operation. The location 404 is used as one of the boundaries for new content 402. In FIG. 4, location 404 is used as the top left corner of new content 402. Alternatively, location 404 may be used as any of the other locations relating to new content 402 including but not limited to the other corners of new content 402, the center or centroid of new content 402, or any other region of 402. For example, the system may attempt to fit new content 402 onto the displayed page 401, and, in the process, may adjust the location of new content 402 to fit within the dimensions of page 401.

Figure 5:
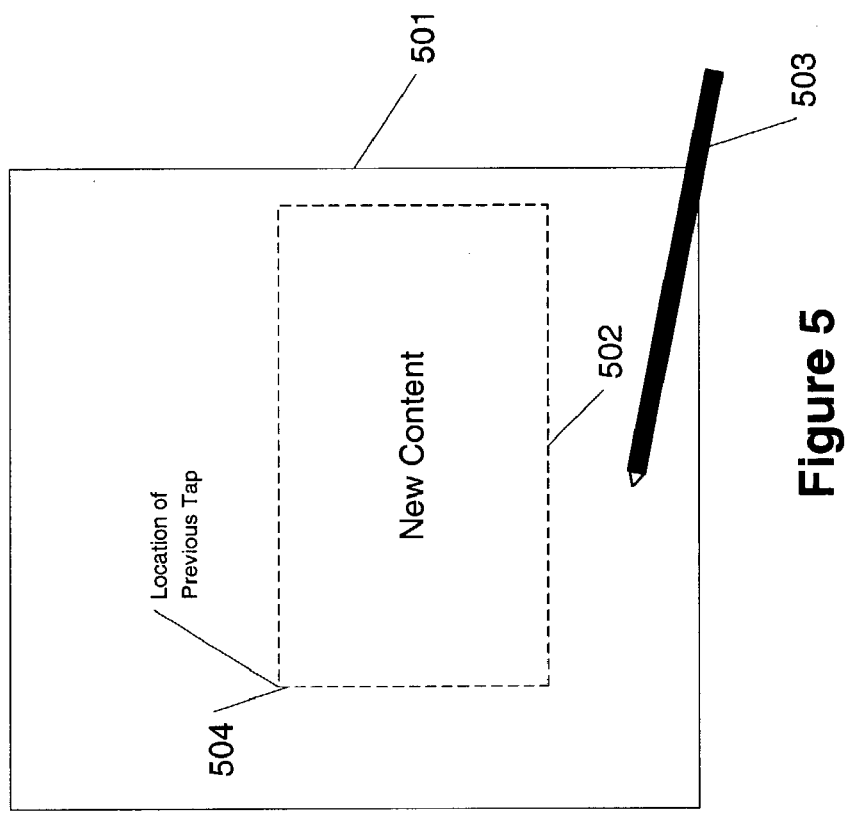
FIG. 5 shows new content being added to the location of a previous tap in accordance with embodiments of the present invention.

FIG. 5 shows an example of new content insertion with a previous insertion point or previous tap of a stylus. FIG. 5 shows page 501 with new content 502 to be inserted. The stylus 503 was used to tap (or with a mouse designate) location 504. Location 504 is then used to position new content 502. How location 504 is used may be adjustable as in FIG. 4. For example, location 504 may be used as the top left corner of new content 502, may be used as any of the other corners of new content 502, or any location related to new content 502 including, but not limited to, the center or centroid of new content 502 and any other point in new content 502.

FIG. 6 shows an example of where new content overlies current content. Page 601 contains current selected content 602 with new content 603 being inserted onto page 601. For example, the user may have selected content 602 prior to attempting to insert new content 603. Here, new content 603 is placed on page 601 overlying current selected content 602 and offset from a corner by offsets 604 and 605. These offsets may range from 0 to any appreciable value, so as to permit the user to visually appreciate that new content 603 is distinct from previously displayed current selected content 602. In this example, the offsets place new content 603 below and to the right of the top and left sides of current selected content 602. While directional arrows associated with offsets 604 and 605, it is appreciated that they may point in other directions as well.

FIG. 7 shows an example where the page 701 includes current content 702. New content 703 is added to page 701 and offset from current content 702 by offsets 704 and 705. These offsets may range from 0 to any appreciable number to visually distinguish new content 703 from current content 702. They may be adjustable as in FIG. 7.

Figure 8:
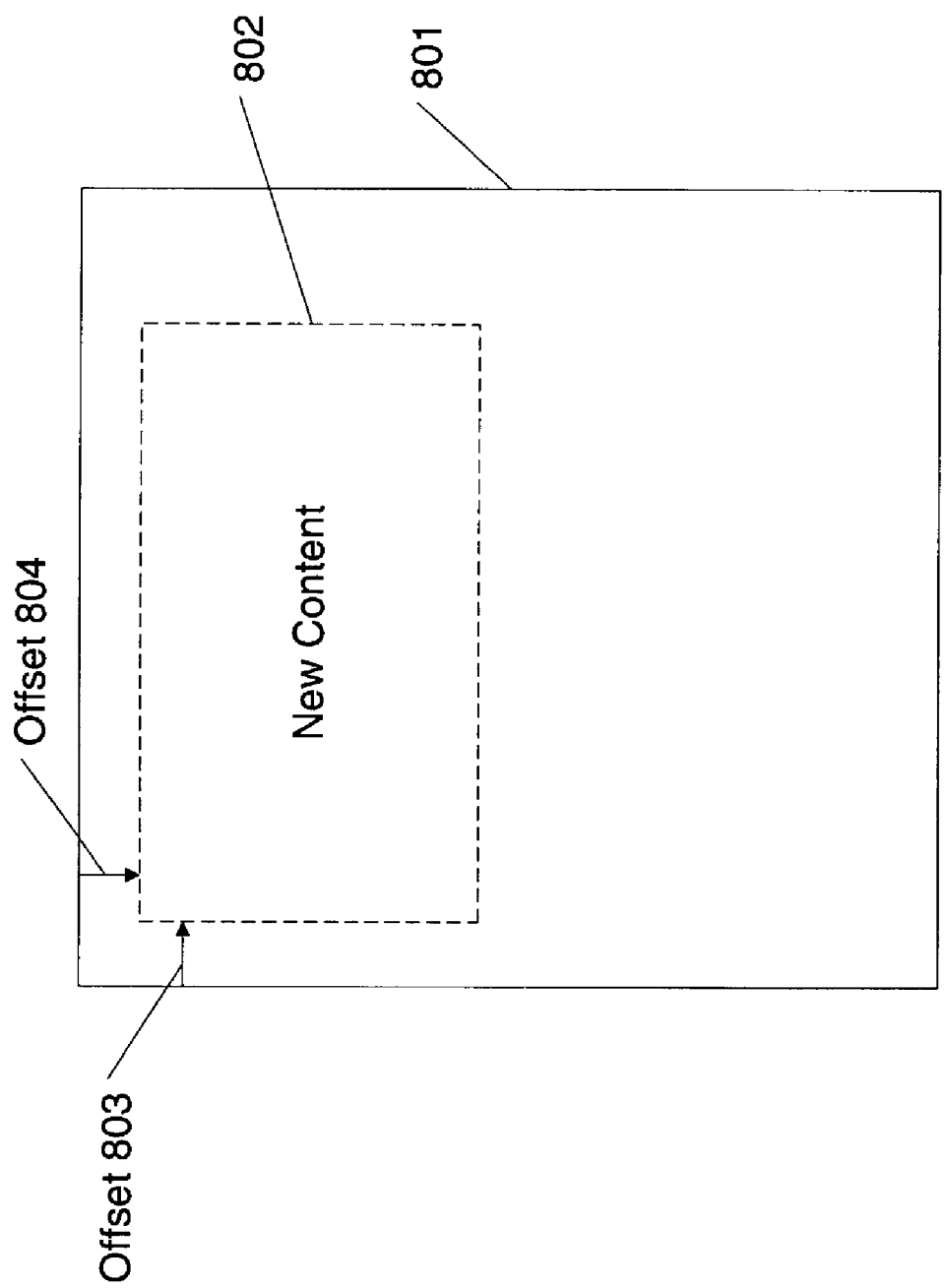
FIG. 8 shows new content being added to a page and accordance with embodiments of the present invention.

FIG. 8 shows page 801 with new content 802 have been deposited in it. Offsets 803 and 804 permit new content 802 to be visually offset from page 801, thereby making it easier to distinguish the new content 802 on page 801. As above, these offsets 803 and 804 may range in value.

Processes for Performing Content Insertion

Figure 9:
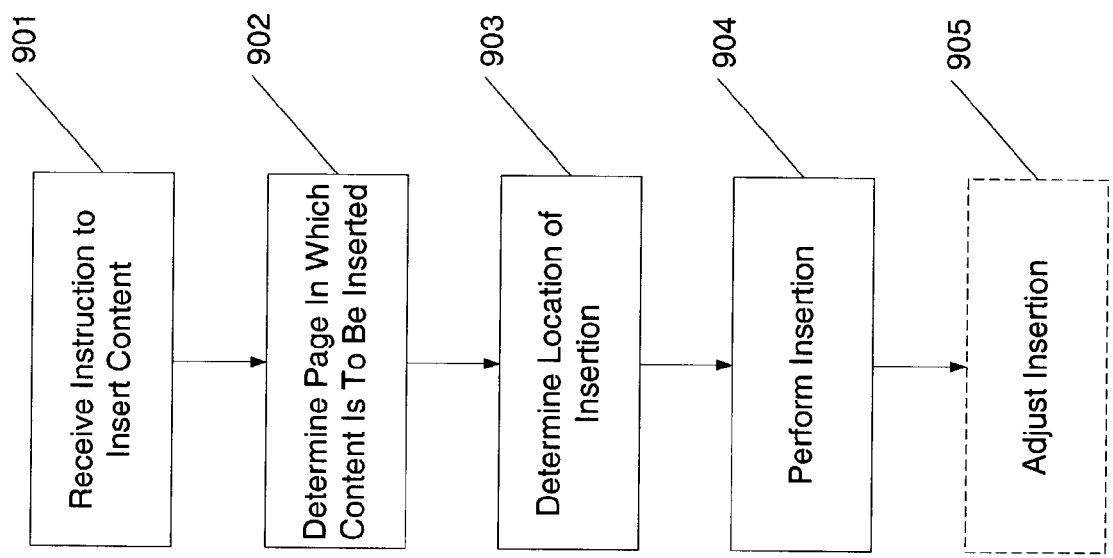
FIG. 9 shows a process for determining and inserting content in accordance with embodiments of the present invention.

FIG. 9 shows a process by which a system may insert new content into an existing page. In step 901, an instruction is received to insert content. In step 902, the system determines in which page content is to be inserted. For example, the page closest to the top left corner of the screen may be considered to be the page in which content is to be inserted. Alternatively the page at the center of the screen, as shown in FIG. 3, may be used as the page in which content is to be inserted. As described above, various processes may be used to determine which page is the page on which the new content is to be inserted.

In step 903, the location of insertion for new content is determined. In step 904, the new content is inserted at the insertion location. Optionally, the insertion from step 904 may be adjusted in step 905. This adjustment may include expanding the length of the page to permit additional content to be placed on the page, adding a new page and putting either the new content or displaced content on the new page, or displacing content onto following pages. These steps may be taken automatically or may be based on user preferences (for example, as specified through user dialog selections). For example, FIG. 11 shows a dialog box 1101 in which a user may specify which options are desired. For example, a user may instruct the system to 1) insert a new page and move the existing content below the insertion point on to the new page; 2) increase the page height to accommodate the new content; 3) paste the new content over existing content; and 4) shrink the new content to fit on the current page. Further, the system may warn if there is an overlap between existing content and the new content. This warning may be disabled or enabled.

Further, step 902 may be incorporated into step 903 by using the current or previous focus of the user. Moreover, step 902 may occur after step 903 or may be eliminated if step 903 results in an insertion location.

Figure 10:
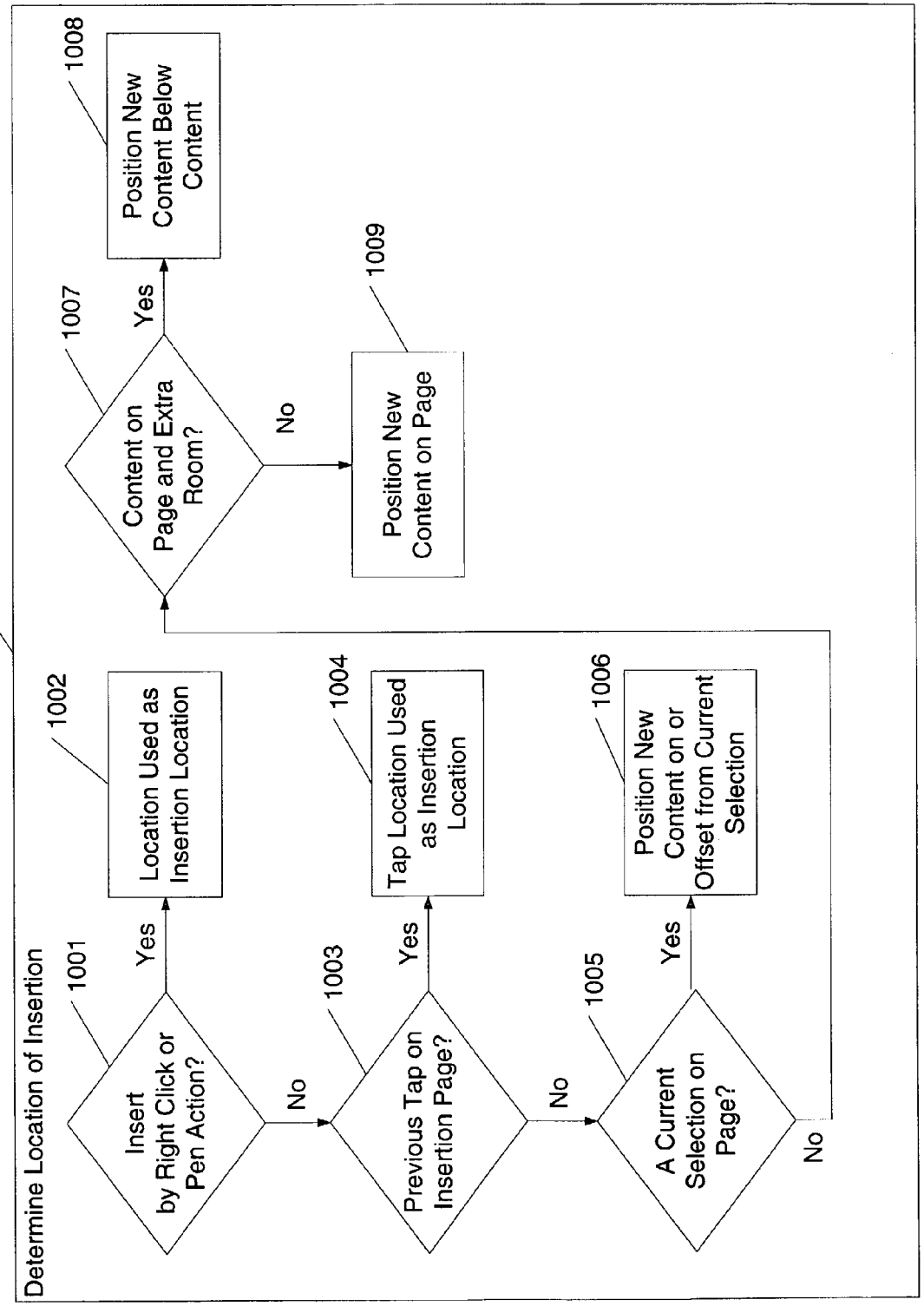
FIG. 10 shows a process for determining a location of insertion in accordance with embodiments of the present invention.

FIG. 10 shows an example of a process for determining the location of the insertion step 903. In the step 1001, the system determines if the insertion action was due to a right click of a mouse or a pen action (for example, a tap of a pen, a drag-and-drop using a pen, and the like). If yes from step 1001, the location of the tap or right click is used as the insertion location in step 1002. If no one from step 1001, the system determines if there was a previous tap on the insertion page. If yes, the system then uses the previous tap location as the insertion location in step 1004. If no from step 1003, the system then determines in step 1005 whether there is a current selection on the page. If yes, in step 1006, the system positions the new content on or offset from the current selection. If no from step 1005, the system then determines if there is content on the page and whether there is enough extra room to be able to fit the new content on the same page. If yes, in step 1008, the system positions the new content below the current selection. If no from step 1007, the system then positions the new content on the page in step 1009. Other options may be made available as set forth in FIG. 11 described above.

Steps 1005 and 1007 may be accomplished by checking the bounding box sizes of the current content on a page and the new content to be added. The comparison of the box sizes with the location of each may result in a determination of overlap. Other surrounding shapes may be used as well. Further, the content itself in the shapes may be used may be used to determine whether an overlap exists.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

The invention claimed is:

1. A method implemented on a tablet PC for inserting content into a document including a plurality of pages, the method comprising:

displaying on the tablet PC at least a portion of two or more pages of the document concurrently in an application window, wherein no visible insertion point is provided to indicate a location of the document that would respond to user input while the document is displayed in the application window;

receiving a user instruction in the tablet PC to insert content into one of the two or more displayed pages of the document, wherein the user instruction does not cause the application window to display a visual indication of a location on the two or more displayed pages where the content is to be inserted;

responsive to the user instruction, utilizing the tablet PC to determine into which of the two or more displayed pages said content is to be inserted, wherein the determination includes performing either identifying the page nearest a corner of the display of the plurality of pages of the document as the page to which the content is to be inserted or identifying the page bridging a line through a middle of the display of the plurality of pages of the document as the page to which the content is to be inserted;

utilizing the tablet PC to determine the location of insertion within said determined page; and utilizing the tablet PC to insert said content at said determined location on said determined page.

2. The method according to claim 1, wherein the corner of the display of the plurality of pages of the document is the top left corner.

3. The method of claim 1, further comprising utilizing a stylus-based input device to input the instruction that is received is the tablet PC.

4. The method according to claim 1, wherein the determined page of the document contains previous content, and wherein the step of inserting the content at the determined location on the determined page comprises:

determining a size of space of the determined page not occupied by the previous content to be greater than or equal to the size of the content and inserting the content at the determined location.

5. The method according to claim 4, wherein the insertion location is below the previous content.

6. The method according to claim 4, further comprising comparing an area of the previous content with an area of the content to determine if an overlap exists, wherein the step of inserting comprising inserting the content offset from the previous content if an overlap exists.

7. The method according to claim 4, wherein said inserting step further comprises the step of resizing said content so as to fit on said determined page.

8. A process implemented in a tablet PC for determining a location on a page of a document for inserting content comprising the steps of:

executing an application to display at least a portion of the page on the tablet PC including a previously placed content, wherein the application does not provide a cursor or blinking cursor while displaying the page;

receiving a user selection in the tablet PC of at least a portion of the previously placed content;

after receiving the user selection, receiving a user instruction in the tablet PC for inserting new content onto the page displayed by the application, the instruction not including an indication of the location on the page where the new content is to be inserted;

responsive to the user instruction, determining the insertion location on the page based on the location of the user selection of at least a portion of the previously placed content on the page;

inserting said new content on the page at the insertion location without removing the previously placed content; and after inserting the new content, automatically expanding the length of the page to permit the page to include both the previously placed content and the new content in such a manner that the new content is offset from the previously placed content, wherein the tablet PC is utilized to perform the steps of determining the insertion location, inserting said content, and automatically expanding the length.

9. The process according to claim 8, wherein the step of inserting said content comprises overlying the content over the previously placed content.

10. The process according to claim 8, wherein said step of inserting said content on the page comprises inserting said content below the previously placed content on the page.

11. The process according to claim 8, wherein an area for said new content is determined and wherein an area for the previously placed content on the page is determined, said process further comprising the step of:

comparing the area of said previously placed content with the area of said new content to determine if an overlap exists, wherein the determination of the insertion is further based on the step of comparing.

12. The process according to claim 8, wherein said inserting step further comprises the step of resizing said new content so as to fit on said page.

13. The method of claim 8, further comprising utilizing a stylus-based input device to input the instruction that is received is the tablet PC.

14. A tablet PC adapted to insert new content into a document comprising a plurality of pages, comparing:

a display on the tablet PC for displaying at least a portion of two or more pages of the document concurrently in a application window, wherein no visible insertion points is provided to indicate a location of the document that would respond to user input while the document is display in the application window;

an input operably connected to the tablet PC for receiving a user instruction to insert content into one of the two or more display pages of the document, wherein the user instruction does not cause the application window to display a visual indication of a location on the one or more displayed pages where the content is to be inserted;

a processor in the tablet PC for determining which of the two or more displayed pages the content is to be inserted responsive to the user instruction, wherein the determination includes performing either indentifying the page nearest a corner of the display of the plurality of pages of the document as the page to which the content is to be inserted or indentifying the page bridging a line through a middle of the display of the plurality of pages of the document as the page to which the content is to be inserted; and an output operably connected to the tablet PC for outputting the content within said determined page.

15. The tablet PC of claim 14, wherein the input operably connected to the tablet PC is configured for use with a stylus-based input device.

16. A computer-readable medium having stored thereon an executable program for inserting content into a document including a plurality of pages, said program being executable by a tablet PC to perform the steps of:

displaying on the tablet PC at least a portion of two or more pages of the document concurrently in an application window, wherein neither a cursor nor blinking cursor is provided to indicate a location of the document that would respond to user input while the document is displayed in the application window;

receiving a user instruction is the tablet PC to insert new content into one of the two or more displayed pages of the document, wherein the user instruction does not cause the application window to display a visual indication of a location on the two or more displayed pages where the new content is to be inserted; and responsive to the user instruction, utilizing the tablet PC to perform the following;

determining into which page of the two or more displayed pages said new content is to be inserted, wherein the determination includes performing either indentifying the page nearest a corner of the display of the plurality of pages of the document as the page to which the new content is to be inserted of identifying the page bridge a line through a middle of the display of the plurality of pages of the document as the page to which the content is to be inserted;

if the user has previously tapped the determined page, determine the location of insertion for the new content based on the location of the tapping within said determined page, inserting said new content as said determined location on said determined page; and if the determined page was not previously tapped by the user, but the determined page currently includes content selected by the user, determine the location for the new content based on the location of the user-selected content and insert the new content at the determined location such that the determined page includes both the user-selected content and the new content, the new content being offset the user-selected content, the determined page being automatically adjusted to fit both the user-selected content and the new content.

17. The computer-readable medium according to claim 16, wherein the corner of the display of the plurality of pages of the document is the top left corner.

18. The computer-readable medium according to claim 16, further comprising: wherein the step of inserting the content at the determined location on the determined page comprises:
   determining a size of space on the determined page not occupied by previous content on the determined page to be less that the size of the new content and positioning the new content at the determined location on the page.

19. The computer-readable medium of claim 16, wherein the receiving step receives the instruction a stylus-based input device.

* * * * *

UNITED STATES PATENT AND TRADEMARK OFFICE
CERTIFICATE OF CORRECTION

| | | |
|---|---|---|
| PATENT NO. | : 7,454,699 B2 | Page 1 of 1 |
| APPLICATION NO. | : 10/393949 | |
| DATED | : November 18, 2008 | |
| INVENTOR(S) | : Dan Altman et al. | |

It is certified that error appears in the above-identified patent and that said Letters Patent is hereby corrected as shown below:

In column 9, line 16, in Claim 3, after "received" delete "is" and insert -- in --, therefor.

In column 9, line 21, in Claim 4, after "of space" delete "of" and insert -- on --, therefor.

In column 9, line 30, in Claim 6, delete "comprising" and insert -- comprises --, therefor.

In column 10, line 11, in Claim 11, after "insertion" insert -- location --.

In column 10, line 18, in Claim 13, after "received" delete "is" and insert -- in --, therefor.

In column 10, line 20, in Claim 14, delete "comparing:" and insert -- comprising: --, therefor.

In column 10, line 22, in Claim 14, after "concurrently in" delete "a" and insert -- an --, therefor.

In column 10, line 23, in Claim 14, delete "points" and insert -- point --, therefor.

In column 10, line 25-26, in Claim 14, delete "display" and insert -- displayed --, therefor.

In column 10, line 58, in Claim 16, after "instruction" delete "is" and insert -- in --, therefor.

In column 10, line 65, in Claim 16, after "following" delete ";" and insert -- : --, therefor.

In column 11, line 4, in Claim 16, after "inserted" delete "of" and insert -- or --, therefor.

In column 11, line 5, in Claim 16, delete "bridge" and insert -- bridging --, therefor.

In column 11, line 11, in Claim 16, after "content" delete "as" and insert -- at --, therefor.

In column 12, line 2, in Claim 16, after "offset" insert -- from --.

In column 12, line 13, in Claim 18, after "less" delete "that" and insert -- than --, therefor.

Signed and Sealed this
Third Day of May, 2011

David J. Kappos
*Director of the United States Patent and Trademark Office*